United States Patent
Yan et al.

(10) Patent No.: US 12,442,484 B1
(45) Date of Patent: Oct. 14, 2025

(54) DISASSEMBLY AND ASSEMBLY COMPONENT AND LIGHT STAND

(71) Applicant: TILTA INC., Burbank, CA (US)

(72) Inventors: Yaxiong Yan, Shenzhen (CN); Sen Wu, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 18/815,632

(22) Filed: Aug. 26, 2024

(30) Foreign Application Priority Data

Apr. 12, 2024 (CN) .......................... 202420766847.X

(51) Int. Cl.
| | |
|---|---|
| *F16M 11/04* | (2006.01) |
| *F21V 21/06* | (2006.01) |
| *G03B 15/02* | (2021.01) |

(52) U.S. Cl.
CPC ............ *F16M 11/041* (2013.01); *F21V 21/06* (2013.01); *G03B 15/02* (2013.01)

(58) Field of Classification Search
CPC ........ F16M 11/041; F21V 21/06; G03B 15/02
See application file for complete search history.

(56) References Cited

U.S. PATENT DOCUMENTS

| | | | | |
|---|---|---|---|---|
| 2023/0366503 | A1* | 11/2023 | Yu ........................ | G03B 17/561 |
| 2024/0081017 | A1* | 3/2024 | Tseng .................. | H05K 7/1488 |
| 2024/0240744 | A1* | 7/2024 | Jin ...................... | F16M 11/2064 |
| 2024/0288039 | A1* | 8/2024 | Song ..................... | A62B 1/14 |
| 2024/0401785 | A1* | 12/2024 | Jiang .................... | F21V 17/002 |
| 2024/0402577 | A1* | 12/2024 | Wu ...................... | G03B 17/561 |
| 2024/0426417 | A1* | 12/2024 | Lin ..................... | F16M 11/045 |

* cited by examiner

*Primary Examiner* — Christopher E Dunay
(74) *Attorney, Agent, or Firm* — LOZA & LOZA, LLP; Derek Yeung

(57) ABSTRACT

This present disclosure pertains to the domain of photographic equipment technology, specifically addressing a disassembly and assembly component and a light stand. The disassembly and assembly component comprises an adaptor and a quick-release assembly. The adaptor is designed to accommodate a light source component, while the quick-release assembly features a first locking component and a quick-release base. The quick-release base sports a first mounting groove for securing the adaptor, and the first locking component is movably connected to the quick-release base, facilitating the locking of the adaptor. the disassembly and assembly component presented in this present disclosure enables effortless attachment and detachment of the light source component to the light stand.

9 Claims, 6 Drawing Sheets

DISASSEMBLY AND ASSEMBLY COMPONENT AND LIGHT STAND

CROSS-REFERENCE TO RELATED APPLICATIONS

The present application for patent claims priority to and the benefit of pending Chinese Application No. 202420766847X, filed Apr. 12, 2024, and hereby expressly incorporated by reference herein as if fully set forth below in its entirety and for all applicable purposes.

TECHNICAL FIELD

The present disclosure pertains to the domain of photographic equipment technology, specifically addressing a disassembly and assembly component and a light stand.

INTRODUCTION

In photography, staging, and various other scenarios, it is often necessary to install lights to augment illumination in diverse areas. A significant number of lamps utilized in these settings require the capability to adjust their pitch angle and illumination direction based on the specific situation. Additionally, it is frequently necessary to change lamps with matching parameters according to on-site conditions. Consequently, a light stand with a dual-support structure is commonly employed as a fixture for the light source, with the lamp then secured onto the bracket. However, given the typically bulky size of lamps, installing them onto the bracket often necessitates the assistance of multiple staff members, posing a challenge.

BRIEF SUMMARY

This patent application introduces a disassembly and assembly component and light stand, specifically designed to alleviate the complexity associated with the installation of large lamps, which traditionally requires a team of workers.

The present disclosure introduces a disassembly and assembly component, wherein comprises:
  An adaptor designed to accommodate a light source component;
  A quick-release assembly, featuring a first locking component and a quick-release base; the quick-release base sports a first mounting groove for securing the adaptor, and the first locking component is movably connected to the quick-release base, facilitating the locking of the adaptor.

In the present disclosure, wherein the mechanism additionally includes an unlocking component that is movably connected to the quick-release base; the unlocking component comprises a first protrusion protruding from the first mounting groove, and the adaptor is equipped with a limiting groove; the unlocking component facilitates the first protrusion to move out of the limiting groove.

In the present disclosure, wherein the unlocking component comprises an unlocking part and a second protrusion; the unlocking part is movably connected to the quick-release base, the first protrusion is connected to the unlocking part, and the second protrusion, which is elastically connected to the unlocking part, protrudes from the first mounting groove; the adaptor, further comprises a limiting block designed to restrain the second protrusion.

In the present disclosure, wherein the unlocking part comprises an unlocking button and a linkage part, the unlocking button is connected to the linkage part; the linkage part is elastically linked to the quick-release base, the first protrusion is connected to the unlocking button, and the second protrusion is elastically connected to the linkage part; a base of the first mounting groove is provided with a first slide groove and a second slide groove, corresponding to the first protrusion and the second protrusion, respectively; the unlocking button enables the first and second protrusions to slide along the first slide groove and the second slide groove respectively, allowing the limiting block to restrain the second protrusion and the first protrusion exits the limiting groove.

In the present disclosure, wherein the adaptor comprises a first quick-mounting plate for installation within the first mounting groove; the limiting groove is positioned on the quick-mounting plate, which is equipped with a first guide bevel to guide the first protrusion, and the limiting block comprises a second guide bevel to guide the second protrusion.

In the present disclosure, wherein the first quick-mounting plate includes a first sliding part and a second sliding part;
  both the first sliding part and the second sliding part are furnished with the first guide bevel and the limiting groove, and the limiting block is situated between the first sliding part and the second sliding part.

In the present disclosure, wherein the first locking component comprises a first locking post, a first locking wrench, and a first locking part;
  the quick-release base further comprises a first clamping part;
  the first clamping part and the first locking part are arranged in an opposing manner;
  the first locking wrench is connected to the first locking part via the first locking post;
  the first locking wrench drives the first locking part to secure or release the adaptor within the first mounting groove.

In the present disclosure, wherein one side of the quick-release base opposite the first mounting groove is furnished with a second quick-mounting plate designed for installation on the light stand's body.

In the present disclosure, wherein the second quick-mounting plate extends in both directions from the quick-release base, forming an adjustment part.

The present disclosure also introduces a light stand, comprising a light stand body and a disassembly and assembly component, where the quick-release assembly is connected to the light stand.

Benefits

In this embodiment, initially, by attaching the adaptor to the light source component, the latter can be removably affixed to the quick-release base. Subsequently, the light source component can be secured within the first mounting groove via the first locking component, thereby accomplishing the swift installation of the light source onto the quick-release base. In case the removal of the light source component is necessary, it can be easily detached from the quick-release base by releasing the first locking component. In essence, the disassembly and assembly component presented in this application enables effortless attachment and detachment of the light source component to the light stand.

REFERENCE NUMERALS

Figure 1:
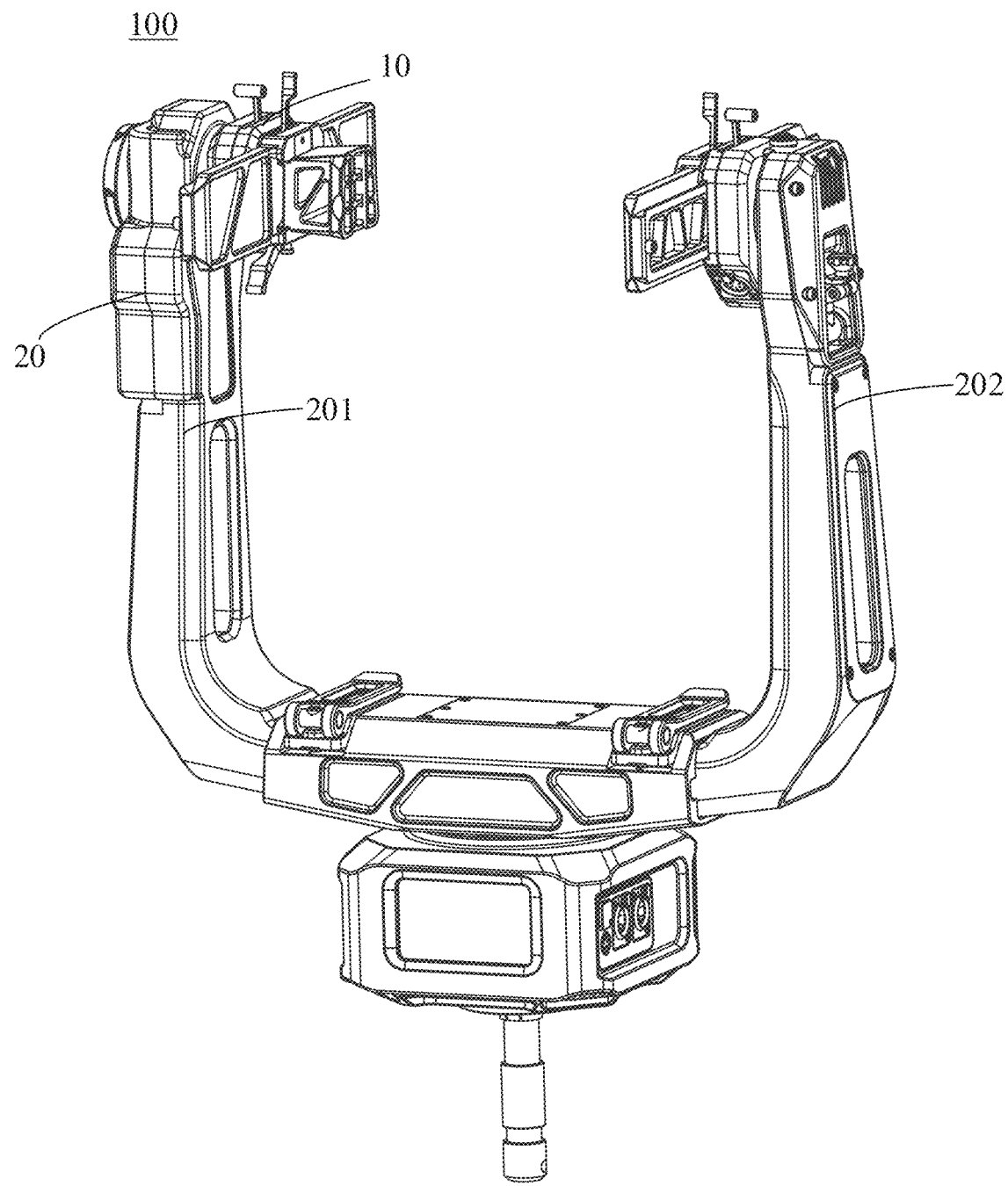
FIG. 1 is a diagram of a light stand according to some aspects of the present disclosure.

100. Light stand; 200. light source component 10. Disassembly and assembly component; 20. Light stand body; 201. First support arm; 202. Second support arm; 203. Second mounting groove; 204. Second locking component; 2041. Second locking post; 2042. Second locking wrench; 2043. Second locking part; 205. Second clamping part;

1. Adapter; 11. Limiting groove; 12. Limiting block; 121. Second guide bevel; 122. First surface; 123. Side surface; 13. First quick-mounting plate; 131. First guide bevel; 132. First sliding part; 133. Second sliding part;

2. Quick-release component; 21. First locking component; 211. First locking post; 212. First locking wrench; 213. First locking part; 22. Quick-release base; 221. First mounting groove; 2211. First slide groove; 2212. Second slide groove; 223. First clamping part; 224. Second quick-mounting plate; 2241. Adjustment part; 23. Unlocking component; 231. First protrusion; 232. Unlocking part; 2321. Unlocking button; 2322. Linkage part; 233. Second protrusion; 234. First elastic component; 235. Second elastic component.

DETAILED DESCRIPTION

Herein, a further elaboration of the present disclosure is provided through concrete embodiments accompanied by the attached figures. Similar components across different embodiments are labeled consistently. While numerous details are provided to facilitate comprehension, experts in the field will readily recognize that certain features may be omitted in specific situations or substituted with alternative components, materials, or methods. In some instances, certain operations related to this application are omitted from the specification to avoid overwhelming the core aspects with excessive descriptions. For those skilled in the art, a detailed description of these related operations is not necessary as they can fully comprehend the operations based on the provided specifications and general technical knowledge in this domain.

Furthermore, the characteristics, operations, or features described herein can be combined in various suitable ways to yield diverse embodiments. Similarly, the steps or actions outlined in the methods can be sequenced or adjusted in manners evident to those skilled in the art. Therefore, the sequences depicted in the specification and figures are solely meant to clarify a particular embodiment and do not indicate a necessary order, unless specified otherwise.

The numbering used for components, such as "First" and "Second," serves solely to distinguish between described objects and does not convey any sequential or technical significance. Unless otherwise specified, the terms "connection" and "linkage" encompass both direct and indirect connections (linkages).

Referring to FIGS. 1-5, this disclosure presents a light stand 100 that includes a light stand body 20 and a disassembly and assembly component 10. The light stand body 20 includes a first support arm 201 and a second support arm 202, between which a light source component 200 can be installed. Furthermore, both the first support arm 201 and the second support arm 202 are respectively connected to the disassembly and assembly component 10 for supporting the light source component 200, and facilitating the installation and removal of the light source component 200 through this mechanism. For example, the disassembly and assembly component 10 enables quick-release of the light source component 200.

Figure 3:
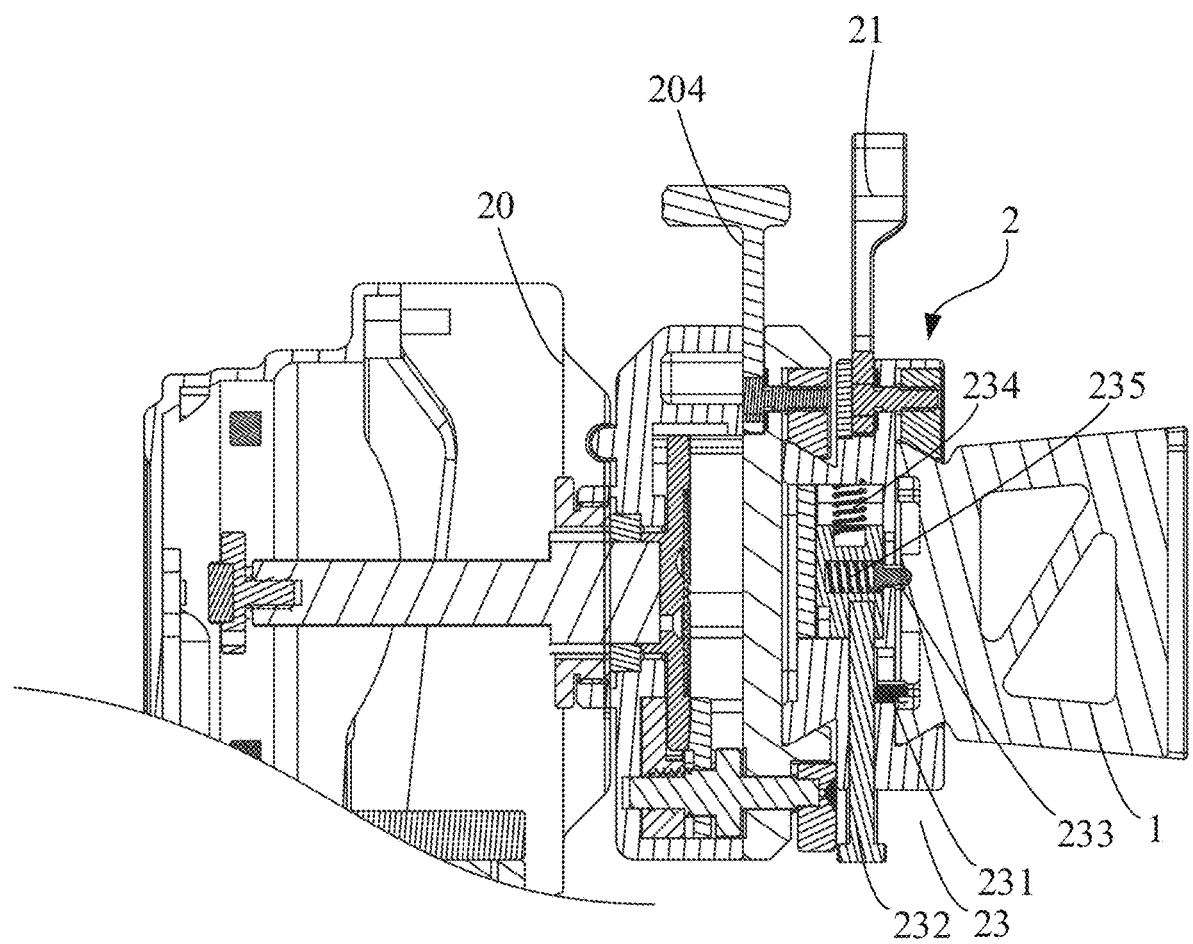
FIG. 3 is a partial cross-sectional view in the A-A direction of FIG. 2 according to some aspects of the present disclosure.

Referring to FIG. 3, the disassembly and assembly component 10 increases an adapter 1 and a quick-release assembly 2. The adapter 1 is designed to fit the light source component 200, while the quick-release assembly 2 includes a first locking component 21 and a quick-release base 22. The quick-release base 22 features a first mounting groove 221 for mounting the adapter 1, and the first locking component 21 is movably connected to the quick-release base 22 for locking the adapter 1.

In some aspects, initially, by attaching the adaptor 1 to the light source component 200, the latter can be removably affixed to the quick-release base 22. Subsequently, the light source component 200 can be secured within the first mounting groove 221 via the first locking component 21, thereby accomplishing the swift installation of the light source onto the quick-release base 22. In case the removal of the light source component 200 is necessary, it can be easily detached from the quick-release base 22 by releasing the first locking component 21. In essence, the disassembly and assembly component 10 presented in this disclosure enables effortless attachment and detachment of the light source component 200 to the light stand 100.

Figure 2:
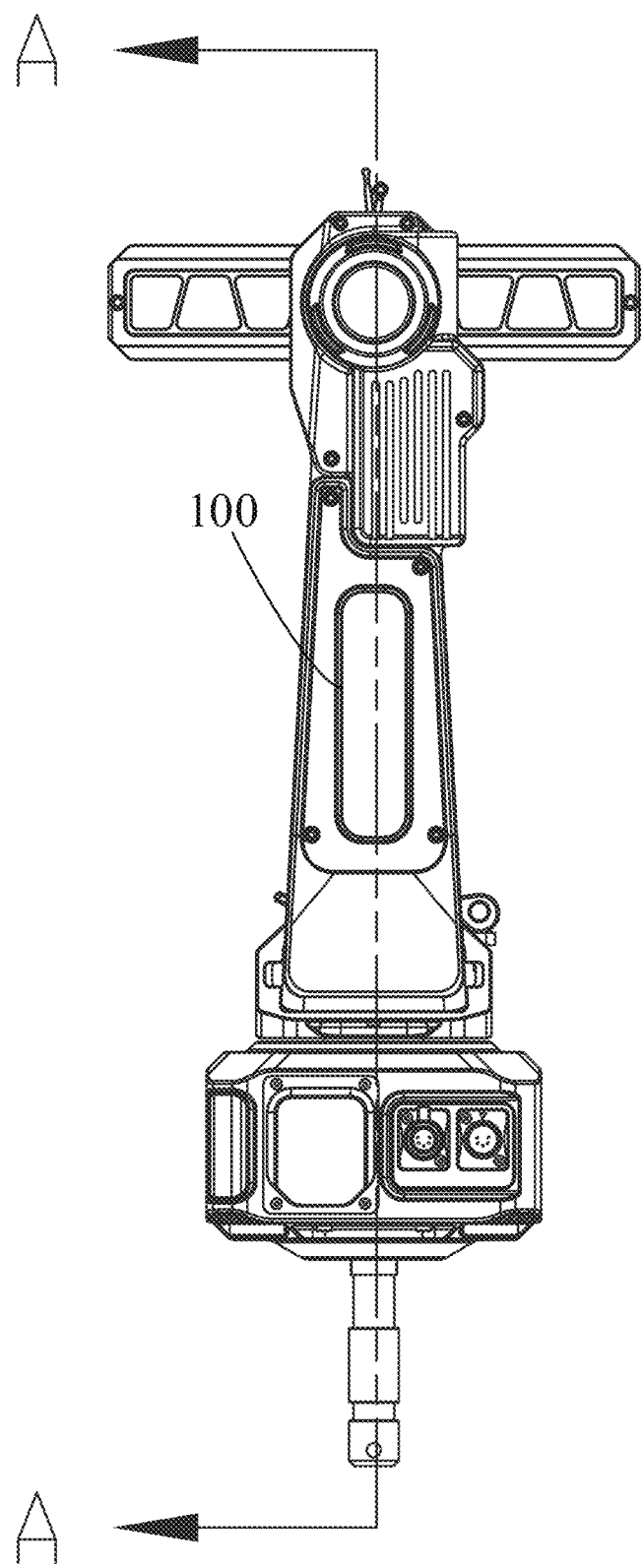
FIG. 2 is a left side view of the light stand according to some aspects of the present disclosure.

Referring to FIGS. 2-3 the disassembly and assembly component 10 additionally includes an unlocking component 23 that is movably connected to the quick-release base 22. The unlocking component 23 sports a first protrusion 231 protruding from the first mounting groove 221, and the adaptor 1 is equipped with a limiting groove 11. The unlocking component 23 facilitates the movement of the first protrusion 231 to move into or out of the limiting groove 11. After installation, the first protrusion 231 can engage within the limiting groove 11, enhancing the stability of the adapter 1 relative to the quick-release base 22. During disassembly, the unlocking component 23 can be pressed to disengage the first protrusion 231 from the limiting groove 11, thereby releasing the adapter 1 from the quick-release base 22 with the limitation imposed by the first protrusion 231 released.

In some aspects, the unlocking component 23 includes an unlocking part 232 and a second protrusion 233. The unlocking part 232 is movably connected to the quick-release base 22, and the first protrusion 231 is connected to the unlocking part 232. The second protrusion 233 is elastically connected (e.g., a spring-loaded mechanism or connection) to the unlocking part 232 and protrudes from the first mounting groove 221. The adapter 1 also includes a limiting block 12 capable of limiting the movement of the second protrusion 233. In some aspects, the presence of the limiting block 12 on the adapter 1 and the second protrusion 233 on the unlocking part 232 facilitate easy disassembly. When the unlocking part 232 is pressed, the limiting block 12 can restrict the movement of the second protrusion 233, keeping the unlocking part 232 in a pressed state while the first protrusion 231 remains disengaged from the limiting groove 11. This design allows the adapter 1 to be easily removed from the quick-release base 22 without pressing the unlocking part 232, simplifying the disassembly of the light source component 200. Notably, in some aspects, both the first support arm 201 and the second support arm 202 of the light stand 100 are equipped with quick-release bases 22. To remove the light, if the unlocking part 232 of the quick-release base 22 on both the first support arm 201 and the second support arm 202 necessitates the use of a finger to depress it, facilitating the exit of the first protrusion 231 from the limiting groove 11, it is imperative that at least one staff member keeps the unlocking part 232 pressed during the removal process. In this example, the second protrusion 233 can restrict the resetting of the unlocking part 232. This enables workers to press the unlocking part 232 on both arms briefly and release, with the first protrusion 231 remaining disengaged. As a result, workers can effortlessly detach the light source component 200 from the light stand 100.

In some aspects, the unlocking part 232 includes an interconnected unlocking button 2321 and a linkage part 2322. The linkage part 2322 is elastically linked to the quick-release base 22, the first protrusion 231 is connected to the unlocking button 2321, and the second protrusion 233 is elastically connected to the linkage part 2322. The base of the first mounting groove 221 is furnished with a first slide groove 2211 (e.g., a slot) and a second slide groove 2212 (e.g., a slot), corresponding to the first and second protrusions 231 and 233, respectively. The unlocking button 2321 enables the first and second protrusions 231 and 233 to slide along the first slide groove 2211 and the second slide groove 2212 respectively, allowing the limiting block 12 to restrain the second protrusion 233 while the first protrusion 231 exits the limiting groove 11. When disassembly is necessary, pressing the unlocking button 2321 initiates movement of the first protrusion 231 and the second protrusion 233 relative to the first slide groove 2211 and the second slide groove 2212, respectively. As a result, the first protrusion 231 exits the limiting groove 11, while the second protrusion 233 engages with the limiting block 12. Guided by the unlocking button 2321, the second protrusion 233 slides along the first surface 122 of the quick-release base 22, in relation to the limiting block 12, until it clears the first surface 122. Once the first surface 122 no longer engages with the second protrusion 233, the elastic force causes the second protrusion 233 to protrude towards the first mounting groove 221. During this process, the side surface 123 of the limiting block 12 serves to constrain the movement of the second protrusion 233, thereby preventing the linkage part 2322 and the unlocking button 2321 from resetting. This ensures that the first protrusion 231 remains in a position where it has exited the limiting groove 11, facilitating the disassembly of the adapter 1 from the quick-release base 22. Notably, a second elastic component 235 (e.g., a spring) is positioned between the second protrusion 233 and the linkage part 2322, providing an elastic connection between them. Similarly, a first elastic component 234 (e.g., a spring) is placed between the linkage part 2322 and the quick-release base 22, ensuring an elastic connection (e.g., spring loaded) between these two components as well.

Figure 4:
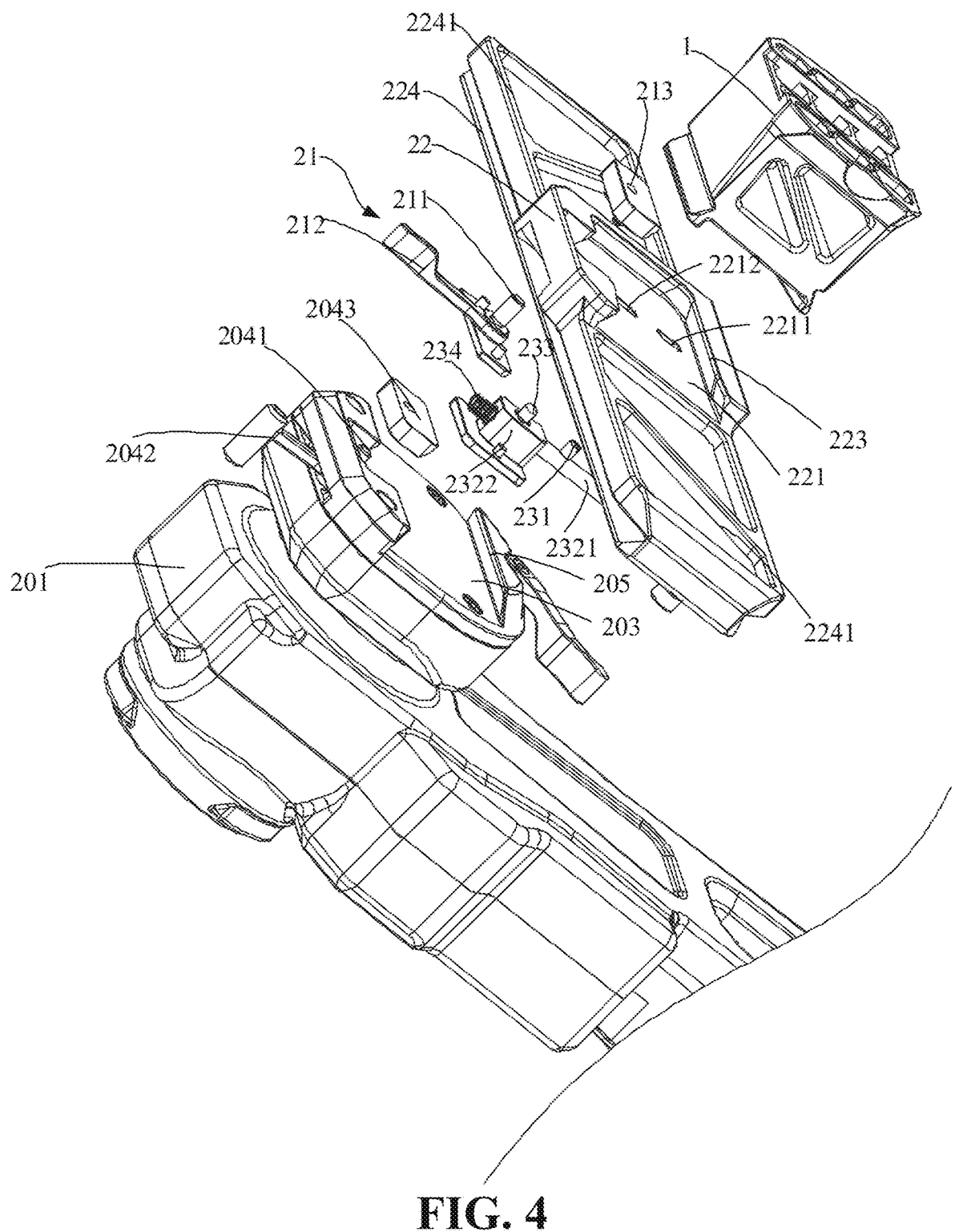
FIG. 4 is an exploded view of a quick-release structure according to some aspects of the present disclosure.
Figure 5:
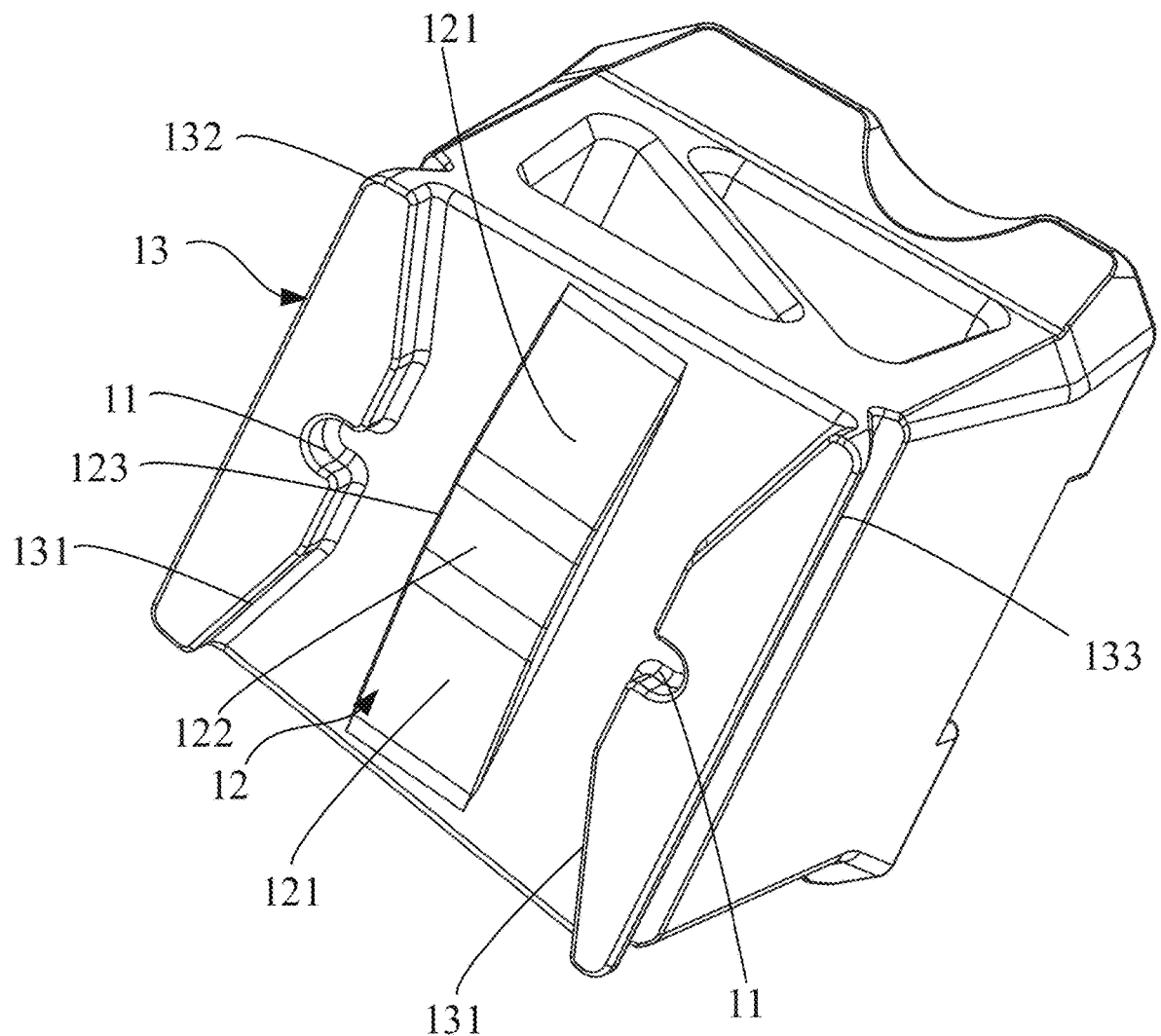
FIG. 5 is a diagram of an adaptor according to some aspects of the present disclosure.
Figure 6:
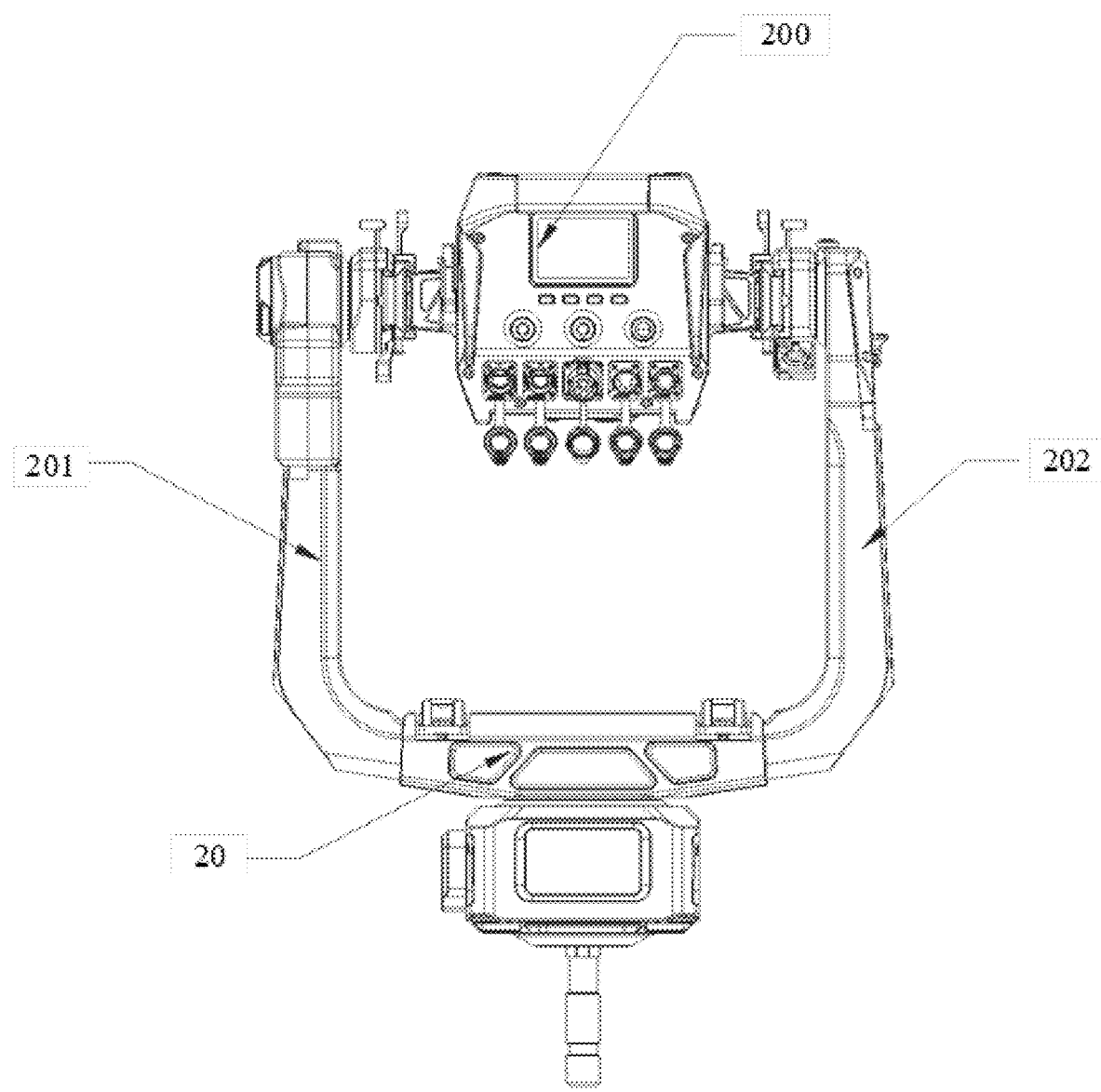
FIG. 6 is a diagram of a light stand including a light source component according to some aspects of the present disclosure.

Referring to FIGS. 4-5, the adaptor 1 incorporates a first quick-mounting plate 13 tailored for installation within the first mounting groove 221. The limiting groove 11 is positioned on the quick-mounting plate 13, which is equipped with a first guide bevel 131 to guide the first protrusion 231, while the limiting block 12 sports a second guide bevel 121 to guide the second protrusion 233. During the installation process, the first quick-mounting plate 13 of the adapter 1 is inserted along the first mounting groove 221. The first guide bevel 131 directs the first protrusion 231, which moves along this bevel during the sliding process and then when the first protrusion 231 slides into the limiting groove 11, the linkage part 2322 elastically provided in the quick-release base 22 can be reset to drive the unlocking button 2321 to move, so as to make the first protrusion 231 move into limiting groove 11 to restrict the movement of the first quick-mounting plate 13. A second guide bevel 121 guides the second protrusion 233, which is elastically connected to the quick-release base 22 and thus gets compressed during the movement of the first quick-mounting plate 13. When installed, the first protrusion 231 is confined within the limiting groove 11, while the second protrusion 233 presses against either the first guide bevel 131 or the first surface 122 of the limiting block 12. For disassembly, pressing the unlocking button 2321 disengages the first protrusion 231 from the limiting groove 11, while the second protrusion 233 is pushed by the limiting block 12 and moves relative to the quick-release base 22 until it resets. At this point, a side surface 123 of the limiting block 12 restricts the movement of the second protrusion 233.

In some aspects, the first quick-mounting plate 13 includes a first sliding part 132 and a second sliding part 133. Both the first sliding part 132 and the second sliding part 133 are furnished with first guide bevels 131 and limiting grooves 11, and the limiting block 12 is situated between the first sliding part 132 and the second sliding part 133. This design accommodates both positive and negative installations.

Referring to FIG. 4, in some aspects, the first locking component 21 includes a first locking post 211, a first locking wrench 212, and a first locking part 213. The quick-release base 22 additionally features a first clamping part 223. The first clamping part 223 and the first locking part 213 are arranged in an opposing manner. The first locking wrench 212 is connected to the first locking part 213 via the first locking post 211. The first locking wrench 212 drives the first locking part 213 to lock or release the adaptor 1 within the first mounting groove 221, thereby simplifying the installation and disassembly of the adapter 1. In some aspects, one end of the first locking post 211 can be threadedly connected to the first locking part 213, while its other end mates with the teeth of the first locking wrench 212. Upon rotating the first locking wrench 212, which turns the first locking post 211, the first locking part 213 shifts relative to the quick-release base 22. This movement, facilitated by the screw threads on the surface of the first locking post 211, serves to compress the first quick-mounting plate 13 of the adapter 1.

In some aspects, one side of the quick-release base 224 opposite the first mounting groove 221 is furnished with a second quick-mounting plate 224 designed for installation on the light stand body 20. Furthermore, the light stand body 20 can also be equipped with a second mounting groove 203 and a second locking component 204 as described, facilitating the quick disassembly and assembly of a second quick-mounting plate 224. In some aspects, the lamp holder body 20 also features a second clamping part 205. The second locking component 204 includes a second locking post 2041, a second locking wrench 2042, and a second locking part 2043. The second clamping part 205 and the second locking part 2043 are positioned opposite each other. The second locking wrench 2042, connected to the second locking part 2043 through the second locking post 2041, enables the tightening or loosening of the adapter 1 or second quick-mounting plate 224 within the second mounting groove 203. This, in turn, eases the installation and disassembly process of the adapter 1. For example, one end of the second locking post 2041 can be threadedly connected to the second locking part 2043, and its other end engages with the teeth of the second locking wrench 2042. Rotating the second locking wrench 2042 turns the second locking post 2041, causing the second locking part 2043 to move relative to the light stand body 20. This action, driven by the screw threads on the surface of the second locking post 2041, presses against the second quick-mounting plate 224 of the quick-release base 22.

In some aspects, the second quick-mounting plate 224 extends in both directions towards the quick-release base 22, forming an adjustment part 2241, which is capable of moving relative to the second mounting groove 203. This design provides flexibility in adjusting the position of the quick-release base 22 relative to the light stand body 20, ensuring the installation balance of the light source component 200.

The examples provided above serve to illustrate the present disclosure for a better understanding and are not intended to limit the scope of the present disclosure. Technicians in the field can derive several simple deductions, modifications, or substitutions based on the core principles of the present disclosure.

What is claimed is:

1. A disassembly and assembly component, comprises:
   an adaptor configured to accommodate a light source component;
   a quick-release assembly, comprising a first locking component and a quick-release base, wherein the quick-release base comprises a first mounting groove configured to mount the adaptor on a first side of the quick-release base, and the first locking component is movably connected to the quick-release base, facilitating locking of the adaptor in the first mounting groove; and
   a second quick-mounting plate on a second side of the quick-release base opposite the first mounting groove on the first side of the quick-release base, the second quick-mounting plate configured to install the disassembly and assembly component on a light stand body.

2. The disassembly and assembly component according to claim 1, further comprising:
   an unlocking component that is movably connected to the quick-release base;
   the unlocking component comprising a first protrusion protruding from the first mounting groove, and the adaptor is equipped with a limiting groove; and
   the unlocking component facilitates the first protrusion to move out of the limiting groove.

3. The disassembly and assembly component according to claim 2, wherein the unlocking component comprises an unlocking part and a second protrusion;
   the unlocking part is movably connected to the quick-release base, the first protrusion is connected to the unlocking part, and the second protrusion is elastically connected to the unlocking part, and the second protrusion protrudes from the first mounting groove; and
   the adaptor further comprises a limiting block configured to restrain the second protrusion.

4. The disassembly and assembly component according to claim 3, wherein the unlocking part comprises an unlocking button and a linkage part connected to the unlocking button; the linkage part is elastically linked to the quick-release base, the first protrusion is connected to the unlocking button, and the second protrusion is elastically connected to the linkage part;
   a base of the first mounting groove is provided with a first slide groove and a second slide groove, corresponding to the first protrusion and the second protrusion, respectively; and
   the unlocking button enables the first and second protrusions to slide along the first slide groove and the second slide groove respectively, allowing the limiting block to restrain the second protrusion and the first protrusion exits the limiting groove.

5. The disassembly and assembly component according to claim 3, wherein the adaptor comprises a first quick-mounting plate configured to install within the first mounting groove; and
   the limiting groove is positioned on the first quick-mounting plate, which is equipped with a first guide bevel to guide the first protrusion, and the limiting block comprises a second guide bevel configured to guide the second protrusion.

6. The disassembly and assembly component according to claim 5, wherein the first quick-mounting plate comprises a first sliding part and a second sliding part; and
   both the first sliding part and the second sliding part are furnished with the first guide bevel and the limiting groove, and the limiting block is situated between the first sliding part and the second sliding part.

7. The disassembly and assembly component according to claim 1, wherein the second quick-mounting plate extends in two directions from the quick-release base, forming an adjustment part.

8. A light stand, comprising:
   a light stand body; and
   a disassembly and assembly component according to claim 1, wherein the quick-release assembly is connected to the light stand body.

9. A disassembly and assembly component, comprises:
   an adaptor configured to accommodate a light source component;
   a quick-release assembly, comprising a first locking component and a quick-release base, wherein the quick-release base comprises a first mounting groove configured to secure the adaptor, and the first locking component is movably connected to the quick-release base, facilitating locking of the adaptor in the first mounting groove,
   wherein the first locking component comprises a first locking post, a first locking wrench, and a first locking part;
   the quick-release base further comprises a first clamping part;
   the first clamping part and the first locking part are arranged in an opposing manner;
   the first locking wrench is connected to the first locking part via the first locking post; and
   the first locking wrench drives the first locking part to secure or release the adaptor within the first mounting groove.

* * * * *